US00RE39319E

(19) United States
(12) Reissued Patent
Park

(10) Patent Number: US RE39,319 E
(45) **Date of Reissued Patent: *Oct. 3, 2006**

(54) COPY PREVENTION METHOD AND APPARATUS FOR DIGITAL VIDEO SYSTEM

(75) Inventor: Tae Joon Park, Seoul (KR)

(73) Assignee: LG Electronics Inc., Seoul (KR)

( * ) Notice: This patent is subject to a terminal disclaimer.

(21) Appl. No.: 10/737,672

(22) Filed: Dec. 17, 2003

Related U.S. Patent Documents

Reissue of:
(64) Patent No.: 6,347,144
Issued: Feb. 12, 2002
Appl. No.: 09/497,465
Filed: Feb. 3, 2000

U.S. Applications:
(63) Continuation of application No. 09/053,288, filed on Apr. 1, 1998, now Pat. No. 6,028,932, which is a continuation of application No. 08/562,042, filed on Nov. 22, 1995, now Pat. No. 5,761,302.

(30) Foreign Application Priority Data

Nov. 26, 1994 (KR) ..... 94-31373

(51) Int. Cl.
*H04L 9/00* (2006.01)

(52) U.S. Cl. ..... 380/201; 380/228
(58) Field of Classification Search ..... 380/200, 380/201, 202, 203, 228; 705/57, 58; 360/60; 386/96, 97; 348/595
See application file for complete search history.

(56) References Cited

U.S. PATENT DOCUMENTS 4,694,489 A * 9/1987 Frederiksen ..... 380/212
4,890,319 A * 12/1989 Seth-Smith et al. ..... 380/202
4,937,679 A * 6/1990 Ryan ..... 360/60
5,054,064 A * 10/1991 Walker et al. ..... 380/202
5,057,947 A * 10/1991 Shimada ..... 360/60
5,231,546 A * 7/1993 Shimada ..... 360/60
5,303,294 A * 4/1994 Kimoto et al. ..... 380/201
5,315,448 A * 5/1994 Ryan ..... 360/60
5,406,625 A * 4/1995 Kotaka et al. ..... 380/201
5,418,853 A * 5/1995 Kanota et al. ..... 380/203
5,477,276 A * 12/1995 Oguro ..... 348/595
5,513,260 A * 4/1996 Ryan ..... 380/200
5,546,461 A * 8/1996 Ibaraki et al. ..... 380/201
5,574,787 A * 11/1996 Ryan ..... 380/201
5,576,843 A * 11/1996 Cookson et al. ..... 386/97
5,579,120 A * 11/1996 Oguro ..... 360/60
5,588,058 A * 12/1996 Le Berre ..... 380/228
5,659,613 A * 8/1997 Copeland et al. ..... 380/202
5,673,357 A * 9/1997 Shima ..... 380/203
5,689,559 A * 11/1997 Park ..... 380/203
5,757,909 A * 5/1998 Park ..... 380/201
5,757,910 A * 5/1998 Rim ..... 380/203
5,761,302 A * 6/1998 Park ..... 380/201
5,778,064 A * 7/1998 Kori et al. ..... 380/203
5,799,081 A * 8/1998 Kim et al. ..... 380/203
5,832,084 A * 11/1998 Park ..... 380/203
5,907,443 A * 5/1999 Hirata ..... 360/60
6,028,932 A * 2/2000 Park ..... 380/203

FOREIGN PATENT DOCUMENTS

EP 0519320 * 12/1992
EP 0589459 * 8/1997

* cited by examiner

*Primary Examiner*—Salvatore Cangialosi
(74) *Attorney, Agent, or Firm*—Birch, Stewart, Kolasch & Birch, LLP

(57) ABSTRACT

A copy prevention method and apparatus for a digital video system is disclosed including the steps of: (a) adding a header area of a header start code and key field to a reproduced bit [stream:] *stream;* (b) decrypting and transmitting the bit stream to which the header area is [added:] *added;* (c) detecting a key field of the decrypted and transmitted bit stream and detecting copy prevention information; and (d) encrypting the bit stream according to information detected from [stop] *step* (c) and *optionally* recording it [an] *on a* tape.

32 Claims, 7 Drawing Sheets

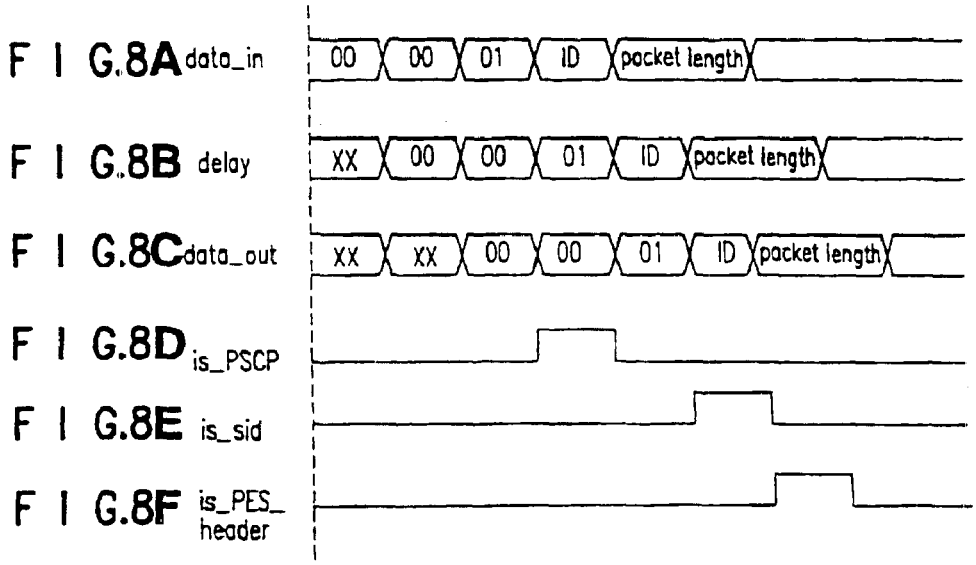
FIG.9
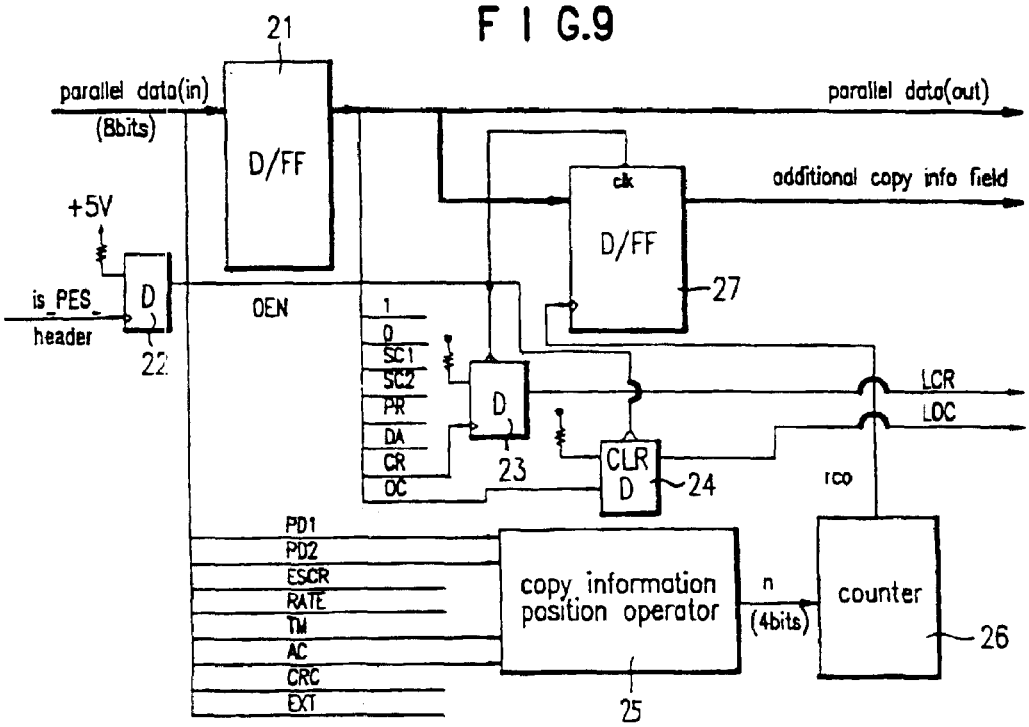

PES header flags
data(in)
packet length data(out)
xx
packet length

LCR

LOC counter
xx
1
2
3
2
xx rco additional copy info field
xx
additional copy info field

COPY PREVENTION METHOD AND APPARATUS FOR DIGITAL VIDEO SYSTEM

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,347,144. The reissue applications are application Ser. No. 10/737,672 (the present application), Ser. No. 10/981,797 (divisional of the present application), Ser. No. 10/981,798 (divisional of the present application), Ser. No. 10/737,671 (reissue of U.S. Pat. No. 6,347,144), and Ser. No. 10/909,248 (divisional of the present application).*

This is a continuation of application Ser. No. 09/053,288, filed Apr. 1, 1998, now U.S. Pat. No. 6,028,932, which is a continuation of Ser. No. 08/562,042, filed Nov. 22, 1995, now U.S. Pat. No. 5,761,302, issued Jun. 2, 1998.

BACKGROUND OF THE INVENTION

The present invention relates to a copy prevention technology for a digital video system, and more particularly, to a copy prevention method and apparatus for a digital VCR to which encryption is introduced to display a picture only in a VCR internally containing a corresponding encryption code, thereby preventing tape from being copied.

General copy prevention methods for analog VCR are presented in U.S. Pat. Nos. 4,819,098, 4,571,642 and 4,577,216.

First, U.S. Pat. NO. 4,819,098 discloses a method in which an interference signal is inserted into a video waveform in an automatic gain control circuit (AGC) of a VCR. Here, the inserted signal does not affect the AGC of its monitor but has the AGC of the VCR record an accurate level of signal on a video tape.

In U.S. Pat. No. [4,571,642] *4,577,216*, there is presented a method in which a phase noise or other corrected signal is inserted into the [chrome] *chroma* burst of a video waveform.

However, all the conventional technologies insert a distributing signal to an analog signal using the difference between a circuit of a monitor and a corresponding circuit of a VCR. Some VCRs may perform copy normally despite of copy prevention. Some monitors cannot display images of the original video tape. A conventional copy prevention introduced to an analog VCR system is hard to be applied to digital storage media (DSM).

Specifically, in a satellite receiver or high-definition TV decoder, as shown in FIG. 2, an MPEG bit stream received by a digital VCR is constructed to transmit a transport header, packetized elementary stream [(PEG)] (*PES*) header and audio and video data respectively or simultaneously.

The PES header contains a PES header flag area of 14 bits which is a field for DSM such as digital VCR, and a PES header field having a variable length. The PES header flag area includes 1-bit copyright (CR) flag, 1-bit original-or-copy (OC) flag, 2-bit PD flag, 1-bit TM flag, and 1-bit AC flag.

The PES header field varies in length, and part thereof is set by the [PC] *PD*, TM and AC flags. A PTS/DTS area is not present if the value of the PD flag is "00". It is 40 bits if the value "10". If the value is "11", the area is 80 bits. A DSM trick mode field is not present if the TM flag is "0". If the flag is "1", the field is 8 bits. An additional copy information field is 8 bits if the AC flag is "1".

When recording is carried out by the satellite receiver or high-definition TV decoder and compressed video data is encoded in encoder 101, it is converted into a packet form in packet processing portion [122] *102* as shown in FIG. 1. If the compressed audio data is encoded in audio encoder 103, it is converted into a packet form in packet processing portion 104.

When the outputs of packet processing portions 102 and 104 are multiplexed in transmission multiplexer 105, a fixed transmission stream shown in FIG. 2 is output to a digital VCR. In this case, for copy prevention, a public-key encryption is applied which is suggested in U.S. Pat. No. 4,200,770. This solves disadvantages in key management or key distribution when a conventional block-cipher or stream cipher algorithm such as data encryption standard (DES) encrypts or decrypts only with a secret key.

This public-key encryption system has all users U hold unique encryption algorithm $E^{PK}{}_U$ and description algorithm $D^{PK}{}_U$. Here, encryption algorithm $E^{PK}{}_U$ for the public-key is opened as a public-key to key supply portion 107. Decryption algorithm $D^{PK}{}_U$ for secret key is kept in secret. The characteristics of $E^{PK}{}_U$ and $D^{PK}{}_U$ are as follows.

First, with respect to all users U and message m transmitted, $D^{PK}{}_U(E^{PK}{}_U(m))=m$.

Second, encryption algorithm $E^{PK}{}_U$ and decryption algorithm $D^{PK}{}_U$ do not require complicated calculation.

Third, it is impossible to find $D^{PK*}{}_U$ satisfying $D^{PK*}{}_U(E^{PK}{}_U(m))=m$ from encryption algorithm $E^{PK}{}_U$.

In the encryption system having the above characteristics, as shown in FIG. 3, when user A transmits message m to user B, encrypter 106 receiving public-key algorithm $E^{PK}{}_U$ for user B's public-key from key supply portion 107 encrypts message m $(E^{PK}{}_U(m))=c)$ and transmits the result to decrypter 109 via a public channel. Here, the public channel indicates a channel in which transmitted data is not kept in secret.

Key decrypter 108 receiving the key information from key supply portion 107 outputs an algorithm $D^{PK}{}_B$ corresponding to encryption algorithm $E^{PK}{}_B$, decrypter 109 decrypts $(D^{PK}{}_B(c))=m)$ the output of encrypter 106 with decryption algorithm $D^{PK}{}_B$, and then transmits *to* user B. In other words, only user B can decrypt decryption algorithm $D^{PK}{}_B$ corresponding to encryption algorithm $E^{PK}{}_B$.

A concept developed from the public-key encryption is presented in U.S. Pat. No. 4,405,829. This public-key encryption system is called RSA system. A method in which the RSA public-key encryption is efficiently calculated via batch processing is presented in U.S. Pat. No. 4,964,164.

However, this public-key encryption is inappropriate for high-velocity encryption. A CA system is *intended* to [present] *prevent* illegal [view] *viewing*. However, there is no method of protecting a program distributed through a digital storage medium, such as *a* digital VCR.

SUMMARY OF THE INVENTION

Therefore, it is an object of the present invention to *provide* an illegal copy prevention method and apparatus for a digital video system in which, in copy tape, *with* encrypted key information is transmitted and recorded so that a copied tape is reproducible only in a VCR having a corresponding encrypted key information, thereby [prevented copy] *preventing copying*.

To accomplish the object of the present invention, there is provided a copy prevention method for a digital video system comprising the steps of: (a) adding a header area of a header start code and key field to a reproduced bit stream; (b) decrypting and transmitting the bit stream to which the header area is added; (c) detecting a key field of the decrypted and transmitted bit stream and detecting copy prevention information; and (d) encrypting the bit stream according to information detected from step (c) and recording it on tape.

For the object of the present invention, there is provided a copy prevention apparatus for a digital video system comprising: a reproduction block for adding key information to a reproduced bit stream, and decrypting and transmitting it; and a recording block for searching key information of the bit stream transmitted from the reproduction block [is] *to* extract copy prevention information, and encrypting and recording the bit stream according to the extracted copy prevention information.

The reproduction block comprises: reproduction means for reproducing data recorded on tape; key insertion means for adding key information to the bit stream of the reproduction means; and decryption means for decrypting the output of the key insertion means and transmitting it to a recording-side VCR.

The recording block comprises: key detecting/correcting means for detecting key information from the transmitted bit stream of a reproducing-side VCR: copy prevention information detecting means for searching the key information detected from the key detecting/correcting means to detect copy prevention information; encrypting means for encrypting the bit stream according *to* the copy prevention information of the copy prevention information detecting means; and recording means for recording the bit stream encrypted in the encrypting means.

The copy prevention information detecting means comprises: a PES header detecting portion for detecting a PES header from parallel data output from the key detecting/correcting means; and a copy prevention information extractor enabled by a PES header detection signal of the PES header detecting portion to detect an additional copy information field.

BRIEF DESCRIPTION OF THE ATTACHED DRAWINGS

FIGS. 8A–8F are waveform diagrams of input/output at the [respect] *respective* portions of FIG. 7;

FIG. 9 is a circuit diagram of the copy prevention information extractor of FIG. 4;

DETAILED DESCRIPTION OF THE INVENTION

Hereinafter, a preferred embodiment of the present invention will be described below with reference to the attached drawings.

Figure 5:
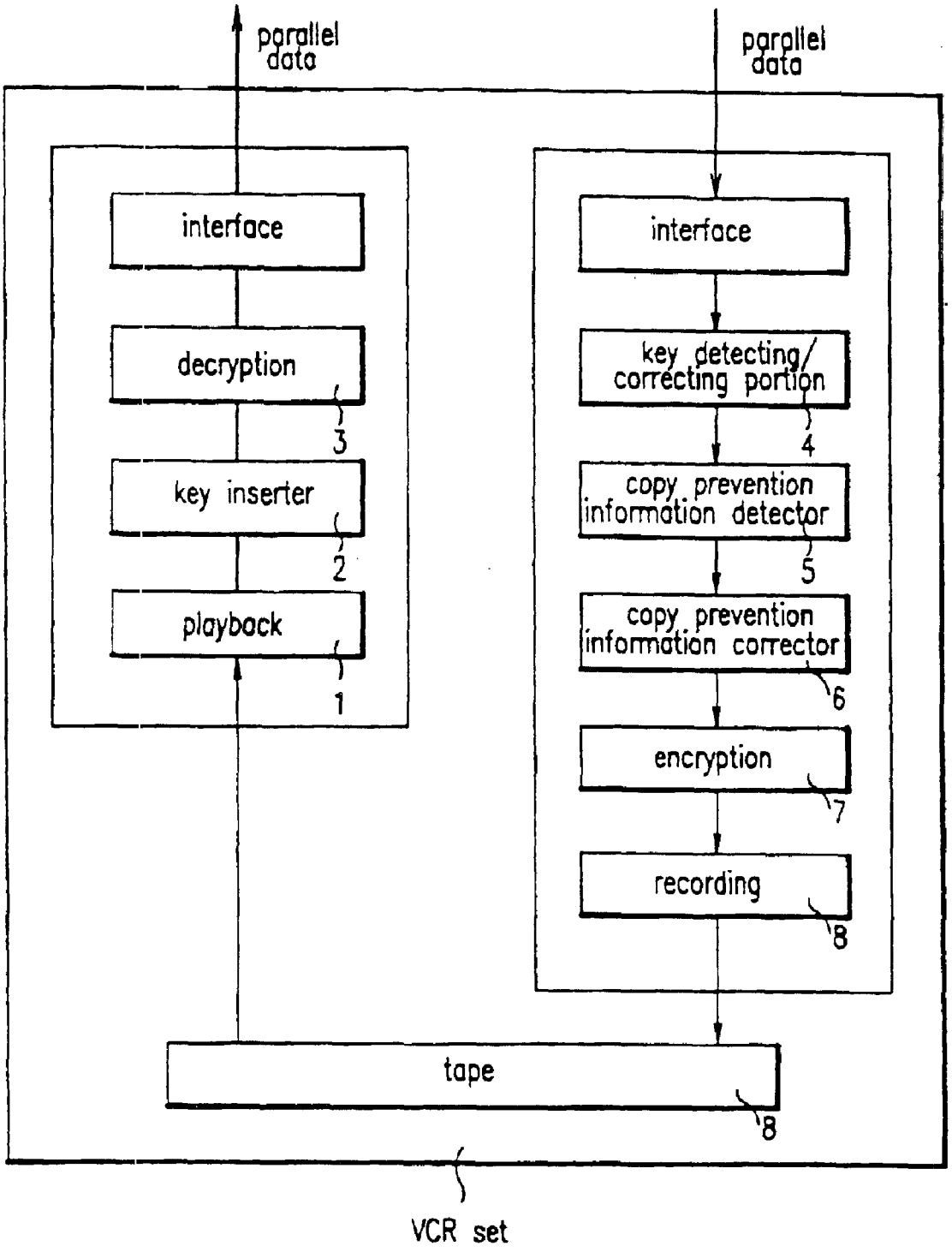
FIG. 5 is a block diagram of a copy prevention apparatus for a digital video system of the present invention.

Referring to FIG. 5, a copy prevention apparatus of the present invention comprises a reproducing portion 1 for reproducing data recorded on tape, a key inserting portion 2 for adding a tape header start code and key field at the front end of a bit stream of reproducing portion 1, a decrypting portion 3 for decrypting the output of key inserting portion 2 and transmitting it as parallel data, a key detecting/correcting portion 4 for detecting a key field from the parallel data transmitted from decrypting portion 3, a copy prevention information detecting portion 5 for detecting a PES header from the key field detected and extracting copy prevention information, a copy prevention information correcting portion 6 for correcting the output of copy prevention information detecting portion 5 if necessary, an encrypting portion 7 for encrypting the output of copy prevention information correcting portion 6, and a recording portion 8 for recording the output of encrypting portion 7 on tape.

Figure 6:
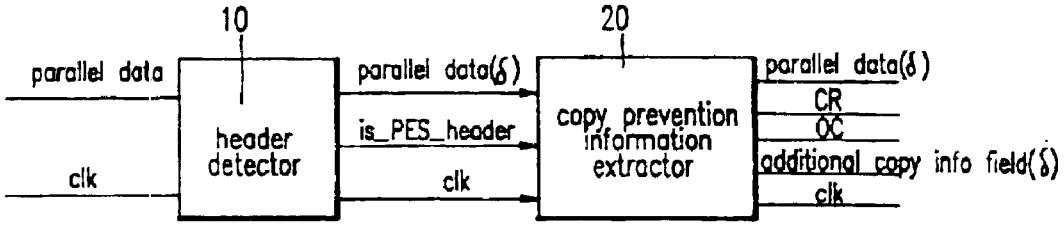
FIG. 6 is a block diagram of the copy prevention information detector of FIG. 5.

As shown in FIG. 6, copy prevention information detecting portion [6] *5* comprises a PES header detecting portion 10 for searching the parallel data in synchronization with a clock clk to detect the PES header, and a copy prevention information extractor 20 enabled by the PES header signal of PES header detecting portion 10 to detect the copy prevention information field.

Figure 7:
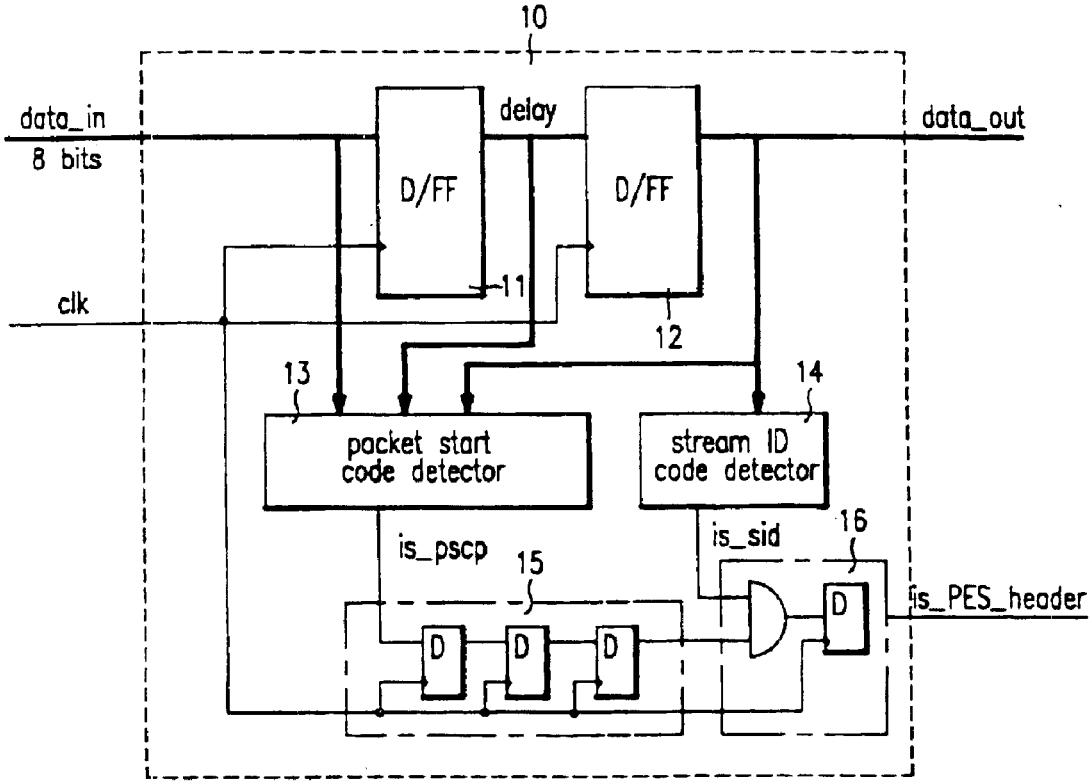
FIG. 7 is a circuit diagram of the PES header detector of FIG. 6.

Referring to FIG. 7, PES header detecting portion 10 comprises first and second flipflops 11 and 12 for sequentially delaying the parallel data according to clock [elk] *clk*, a packet start code detector 13 for searching the parallel data and the output of first and second flipflops 11 and 12 to detect the packet start code of the PES header, a stream ID detector 14 for searching the output of second flipflop 12 to detect the stream ID of the PES header, a delay 15 for sequentially delaying the output is-pscp of packet start code detector 13 according to clock clk, and a detection signal generator 16 for logically multiplying the outputs of delay 15 and stream ID detector 14 and outputting a PES header detection signal is-PES-header.

As shown in FIG. 9, copy prevention information extractor 20 comprises a D-flipflop 21 for holding the parallel data output from PES header detector 10, a D-flipflop 22 for holding PES header detection signal is-PES-header of PES header detector 10, a D-flipflop 23 cleared by the output of D-flipflop 22 and holding voltage (+5V) by a CR signal of the output of D-flipflop 21 and outputting a signal LCR, a D-flipflop 24 cleared by the output of D-flipflop 22 and holding voltage (+5V) by an OC signal of the output of D-flipflop 21 and outputting a signal [LOR] *LOC*, a copy prevention information position operator 25 for searching the parallel data of PES header detector 10 and calculating the position of an additional copy information field, a counter 26 for counting the output of copy information position operator 25, and a D-flipflop 27 for holding the additional copy information field of the output of D-flipflop 21.

Figure 4:
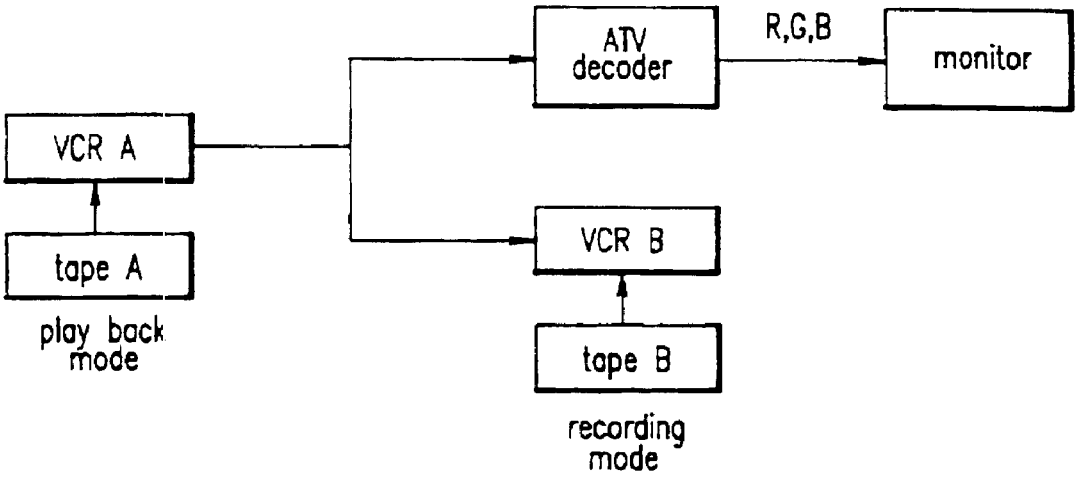
FIG. 4 shows connections of systems of the present invention.

The operation and effect of the present invention will be explained below. Generally, in case of reproducing or copy recording data on [tapa] *tape*, connections between systems are made as shown in FIG. 4.

With those connections, an MPEG bit stream reproduced from VCR A is input to a satellite receiver or high-definition TV so that it cannot be recognized whether the stream is displayed on a screen or input to VCR B and recorded on another video tape.

For this reason, according to the present invention, in case that the bit stream reproduced from VCR A is copied from VCR B, information on copy prevention is transmitted to VCR B from VCR A. VCR B analyzes this information which is recorded with the bit stream.

Here, the insertion position of the copy prevention information contained in a GA bit stream is very limited because it must not affect decoding of the decoder of the satellite receiver or high-definition TV so that an image is displayed normally on a monitor. The copy prevention information may be inserted into the front end of the MPEG bit stream or inside the PES header.

When the MPEG bit stream is decoded in units [or] *of* group of picture (GOP), the respective GOPs are classified by their [cop] *GOP* start codes. This is useful in transmitting initialization data to a recording-side VCR because decoding is never affected even when a slight amount of data is added to the front end of the MPEG bit stream.

The case of inserting the copy prevention information into the PES header is useful in repeated transmission of information because copy prevention of a recording medium such as DSM is decided using CR and OC flaps of the PES header and additional copy information field. In this case, there are a variety of copy preventing methods.

First, when a mode of "No Copy" is detected from the additional copy information field of the PES header, VCR B is not able to enter its recording mode.

Second, when a mode of "Copy Permitted" is detected in order to implement a copy prevention such as DAT mode, VCR B records but "No Copy" mode is recorded in the additional copy information field to interrupt recopying from a copying tape. This means that a secondary source *tape can be made*, but a third source tape cannot.

Third, for "Back-up Copy", tape B copied from VCR B is reproducible normally only in VCR A. According to this method, reproducing-side VCR A encrypts the bit stream with its own inherent key and records it on tape so that only reproducing-side VCR A decrypts the MPEG bit stream recording on the tape. For every VCR set, a unique key is provided, encrypted by VCR's key and recorded on tape B. However, the VCR set for recording tape B is VCR B and tape B is encrypted by VCR A's key so that VCR A's key needs to be transmitted to VCR B with GA bit stream.

Accordingly, when the key information of VCR A is transmitted as a header in advance prior to the bit stream in the "Back-up Copy", it is recorded at the front end of tape B, which satisfies the insertion position of the copy prevention information mentioned before.

Figure 1:
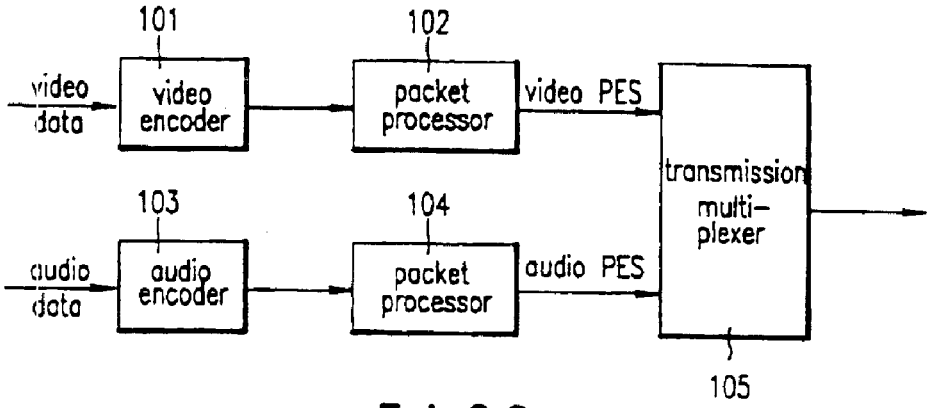
FIG.1 prior art
FIG. 1 is a block diagram of a conventional packet processing apparatus.
Figure 2:
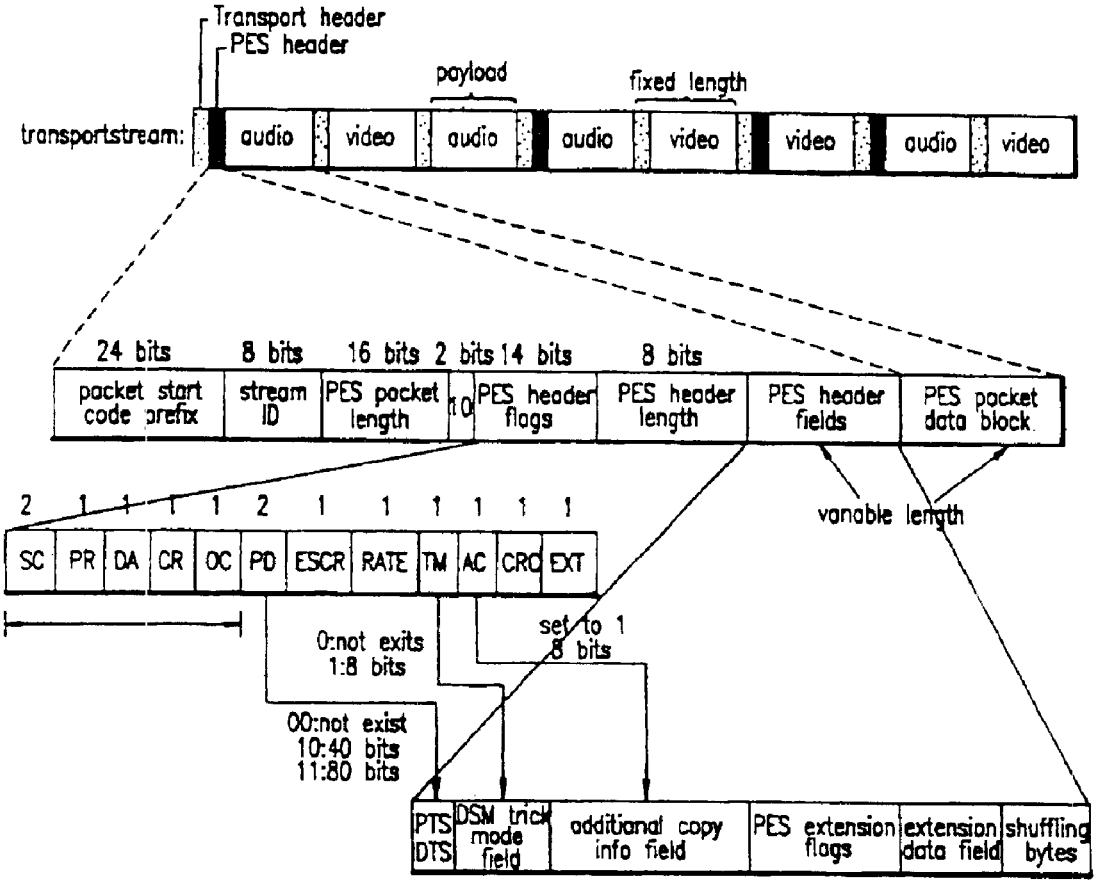
FIG. 2 shows an example of a general transmission stream.
Figure 3:
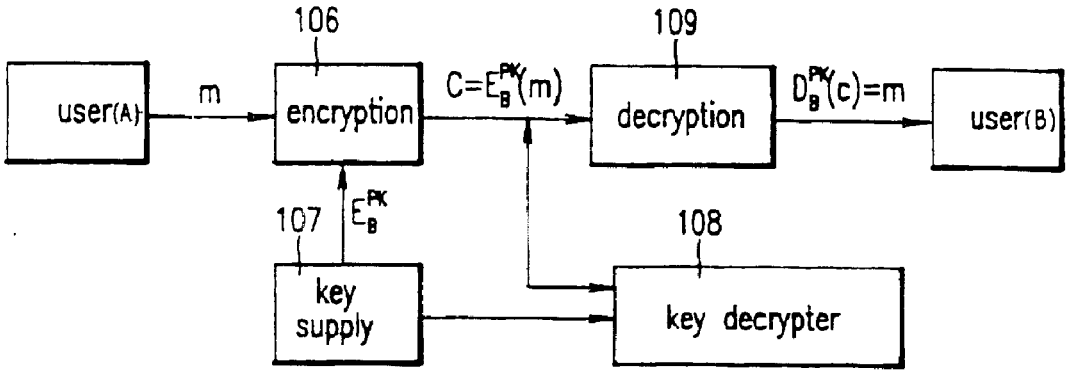
F I G.3 prior art
FIG. 3 is a block diagram of a conventional public-key encryption system.

Here, as shown in FIG. 2, the position of the additional copy information field is varied within the PES header according to whether presentation time stamp (PTS)/Decoding time stamp (DTS) and DSM trick mode field are present or not. This varied position must be compensated. Here, information transmitted through the additional copy information is a copy prevention method to be performed by recording-side VCR B.

Figures 11A, 11B, 11C, 11D:
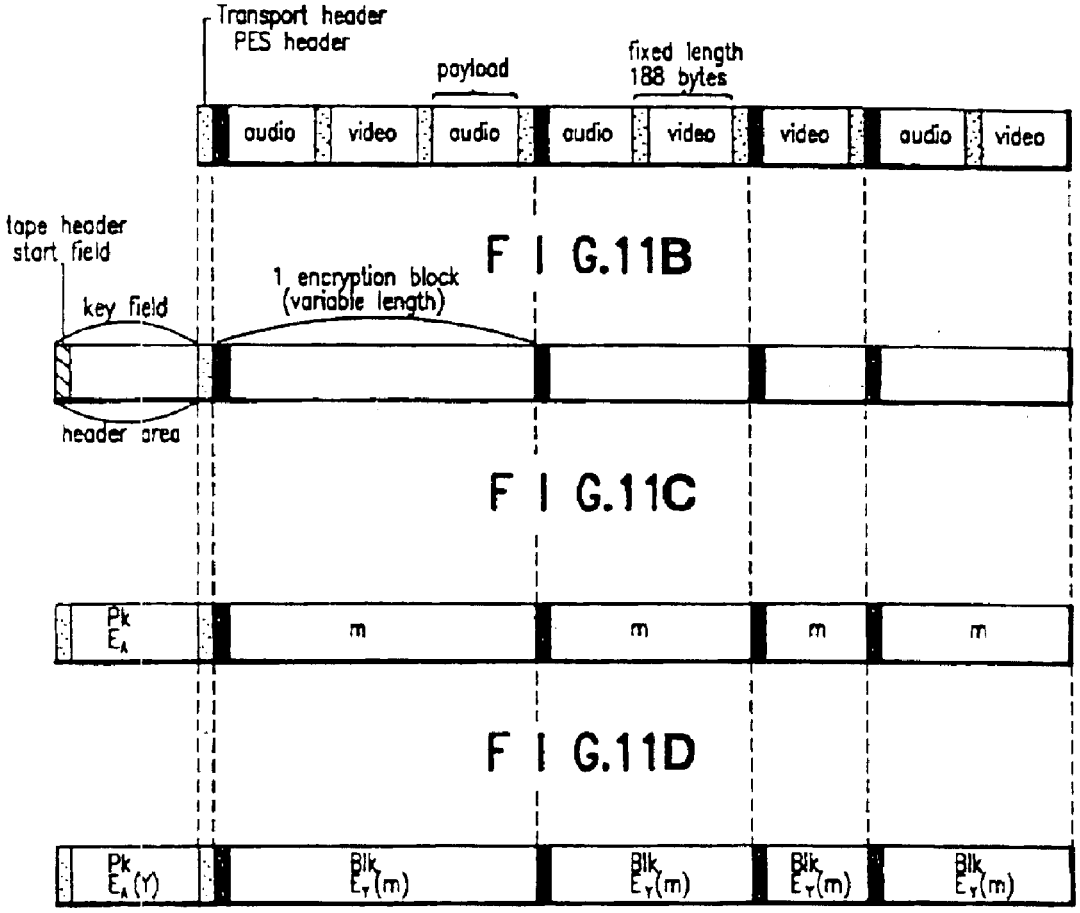
FIGS. 11A–11D show examples of a bit stream of the present invention.

In case of recording the bit stream shown in FIG. 11A in the method of "Back-up Copy", the format of the bit stream recorded on tape is determined as shown in FIG. 11B.

Here, a header area added to the front of the MPEG bit stream is formed with a tape header start code, that is, the header identifier code, and a key field for storing key information. In case of encrypting the MPEG bit stream in units of GOP, encryption blocks are classified by the packet start code prefix and stream ID of the PES header. The encryption block is a basic unit of encryption and can change whether encryption is performed in units of the encryption block, and encryption algorithm and key selection. Here, the encryption blocks must not be encrypted until the additional copy information field of the PES header. Encryption is performed until the end of the encryption block after the additional copy information field. The first 'transmission header' is not encrypted.

The operation of performing the "back-up Copy" mode by adding the header will be described below.

First, in copying, when recording data of tape A is encrypted, reproducing-side VCR A decrypts it using the key information of the key field so as to make message m. Its key information is added to the header and transmitted in the format of FIG. 11C.

Recording-side VCR B records the key information transmitted from reproducing-side VCR A on the header of copying tape B and then records the encrypted bit stream. Here, when the key information is transmitted from reproducing side to recording side, for security, a public-key encryption may be employed to the system because the information may be exposed to a pirate.

Such public-key encryption system ensures the secret of data even though the public-key is exposed but cannot be processed in real-time due to a great amount of calculation. Therefore, this system is not improper when the MPEG bit stream is encrypted directly. The "Back-up Copy" can be implemented when the MPEG bit stream is encrypted using a block-cipher algorithm or stream-cipher algorithm such as DES and a key used is encrypted in the public-key encryption.

In this case, every VCR u incorporates encryption algorithm $E^{PK}{}_U$ corresponding to the public-key and decryption algorithm $D^{PK}{}_U$ corresponding to the secret key. Encryption algorithm $E^{PK}{}_U$ takes a power key of VCR u, and decryption algorithm $D^{PK}{}_U$ to an internal key of VCR u.

Here, the internal key may be opened to the public. Reproducing-side VCR A transmits the internal key on the key field of the header because another VCR encrypts using the internal key. Recording-side VCR B randomly selects a key Y used in the block-cipher algorithm such as DES and encrypts it with the public-key encryption system using an external key $E^{PK}{}_A$. The result is recorded on the key field of copying tape B.

Sequentially, the data is divided into encryption blocks and encrypted and recorded in the block-cipher algorithm using key Y. In this method, the bit stream of FIG. 11D is recorded on copying tape B.

When copying tape B is reproduced in reproducing-side VCR A, key Y can be restored by decryption $D^{PK}{}_A[E^{PK}{}_A(Y)]$ in which data is decrypted properly. In other VCRs, key Y cannot be found, which disables the decryption of the bit stream.

[As] *An* embodiment of the present invention, shown in FIG. 5, for performing such *an* operation will be described below.

When playback starts for tape copying, reproducing portion 1 detects data recorded on tape as shown in FIG. 11A, and amplifies it by a predetermined level. As shown in FIG. 11B, key inserting portion 2 adds a header having a tape header start code and key field to the GA bit stream of reproducing portion 1 shown in FIG. 11A. Copy prevention information is loaded on the additional copy information field of the PES header to form a format shown in FIG. 11C. Here, decrypting portion 3 decrypts the bit stream formed in key inserting portion 2 and transmits it as parallel data to the recording-side VCR via an interface.

When the bit stream of FIG. 11C is transmitted to the recording-side VCR via the interface, key detecting/correcting portion 4 detects the key field added to the bit stream and corrects the key field if necessary.

Copying prevention information detecting portion 5 searches the PES header area to detect the additional copy information field. Here, though a slight amount of information is recorded in the additional copy information field, redundancy is provided in several areas of the bit stream to increase reliability of information transmitted.

Copy prevention information detecting portion 5 extracts the value of AC flag from the PES header flag in order to calculate the position of the additional copy information field because it varies within the PES header. Here, when copy prevention information correcting portion 6 corrects the output of copy prevention information detecting portion 5, encrypting portion 7 performs encrypting using the block-cipher algorithm such as DES. Here, copy prevention information correcting portion 6 performs correction while the input data is stored in a RAM. Accordingly, encrypting portion 7 records the encrypted bit stream on tape in recording portion 8. Because the key information of the reproducing-side VCR is added on the copying tape, only a VCR having this key information can reproduce tape normally.

As shown in FIG. 6, in copy prevention information detecting portion 5, PES header detecting portion 10 searches the output of key detecting/correcting portion 4 and outputs a header detection signal is-PES-header. After header detection signal is-PES-header is input, copy prevention information extractor 20 detects the additional copy information field and OC and CR flags.

PES header detector 10 for detecting the PES header is formed as shown in FIG. 7. When bit stream data_in is input as shown in FIG. 8A, first flipflop 11 synchronized to clock clk is delayed for a predetermined time to output the bit stream delayed as shown in FIG. 8B. Second flipflop 12 delays the output of first flipflop 11 by are predetermined time and outputs the bit stream delayed as shown in FIG. 8C.

Here, packet start code detecting portion 13 searches the bit stream shown in FIG. 8A and the output of first and second flipflops 11 and 12 shown in FIGS. 8B and 8C in order to detect the packet start code of the PES header. When detection signal is-pscp is output as shown in FIG. 8D, delay 15 in which flipflops are coupled at multi-stages delays it sequentially according to clock clk.

Meanwhile, stream ID code detector 14 searches the output of second flipflop 12 and detects the stream ID area of the PES header. Then, detection signal is-sid shown in FIG. 8E is output to detection signal generator 16. Detection signal generator 16 logically multiplies the outputs of delay 15 and stream ID code detector 14, and the flipflops hold the output of the AND gate according to clock clk so that PES header detection signal is-PES-header is output to copy prevention information extractor 20, as shown in FIG. [8P] *8F*.

Here, copy prevention information extractor 20 for detecting the copy prevention information is formed as shown in FIG. 9. When the parallel data output from PES header detector 10 and shown in FIG. 10A is held and output as shown in FIG. 10B, D-flipflop 22 synchronized to PES header detection signal is-PES-header of PES header detector 10 shown in FIG. 8F holds voltage +5V so that a HIGH signal is output to the clear ports of D-flipflops 23, 24 and 27 to release the clear states.

Figures 10A, 10B, 10C, 10D, 10E, 10F, 10G:
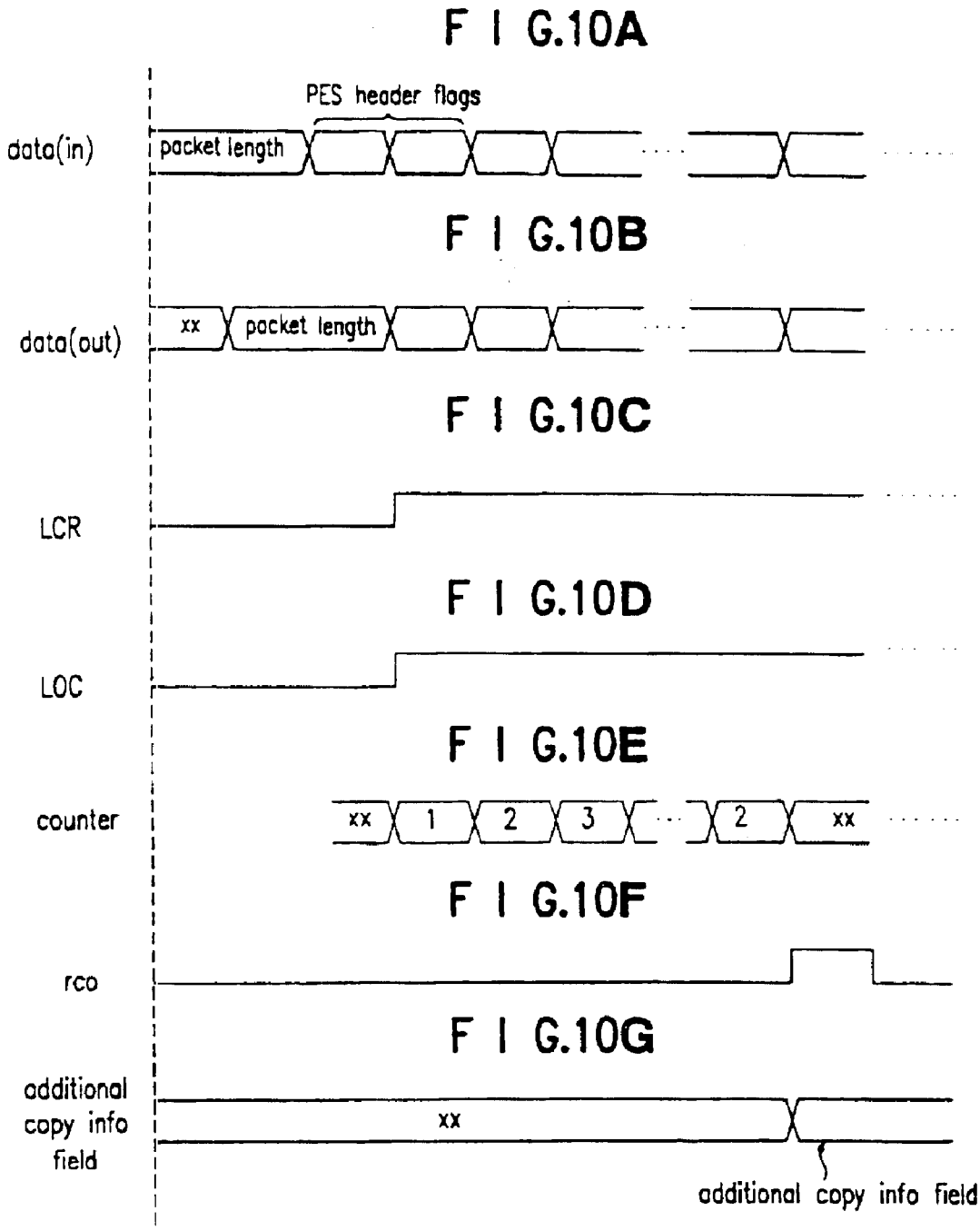
FIGS. 10A–10G are waveform diagrams of input/output at the respective portions of FIG. 9.

D-flipflops 23 is synchronized to the CR flag or the output of D-flipflop 21 shown in FIG. 10B to hold voltage Vcc so that a HIGH signal LCR is output as shown in FIG. 10C. D-flipflop 24 is synchronized to the OC flag of the output of D-flipflop 21 to hold voltage Vcc so that a HIGH signal LOC is output as shown in FIG. 10D.

Copy prevention position detector 25 searches the PD, TM and AC flags of the parallel data of PES header detector 10 shown in FIG. 10A to calculate the position of the additional copy information field, which is output to counter 26 as shown in FIG. 10E. Counter 26 receiving the 4-bit value performs counting so that a HIGH signal is output as shown in FIG. 10F at a predetermined counting value.

D-flipflop 27 synchronized to HIGH output rco of counter 26 holds the additional copy information field from the parallel data of D-flipflop 21 shown in FIG. 10B. The field is output as shown in FIG. 10C.

As described above, in the copy prevention method and apparatus for a digital video system of the present invention, a key information is recorded with a bit stream so that a VCR having the key information reproduces tape normally, thereby preventing illegal copy of tape. In addition, for key information transmission, the public-key encryption is introduced to disable a pirate to release the copy prevention, increasing reliability of copy prevention.

What is claimed is:

1. A copy prevention method for a digital video system comprising the steps of:

(a) receiving [a] digital data [stream reproduced from a digital medium];

(b) detecting an encryption key, which is a portion of said received digital data [stream];

(c) decrypting said encryption key using key information;

(d) decrypting *digital video content included in* said received digital data [stream] based on said decrypted encryption key; and (e) transmitting said decrypted digital [data stream] *video content* to at least one of a [monitor and a digital recorder] *reproducing device and a recording device*.

2. A copy prevention method for a digital video system as claimed in claim 1, wherein said key information is predetermined by said digital video system.

3. A copy prevention method for a digital video system as claimed in claim 1, wherein said decrypting step (d) [is operated in] *operates on* units of *a* predetermined block of said received digital data [stream].

4. A copy prevention apparatus for a digital video system comprising:

[receiving means for receiving a] *a receiver to receive* digital data [stream reproduced from a digital medium];

a key detector to detect an encryption key, which is a portion of said received digital data stream;

a decryption unit to decrypt said encryption key using key information and to decrypt *digital video content included in* said received digital data [stream] based on said decrypted encryption key; and a controller to control transmission of said decrypted digital [data stream] *video content* to at least one of a [monitor and a digital recorder] *reproducing device and a recording device*.

5. A copy prevention apparatus for a digital video system as claimed in claim 4, wherein said key information is predetermined by said digital video system.

6. A copy prevention apparatus for a digital video system as claimed in claim 4, wherein said decryption unit [is operated in] *operates on* units of *a* predetermined block of said received digital data [stream].

7. A copy prevention method for a digital [video] *data* system comprising the steps of:

(a) receiving [a] digital data [stream reproduced from a digital medium];

(b) detecting an encryption key, which is a portion of said received digital data [stream];

(c) decrypting said encryption key using key information; *and*

(d) decrypting *digital content included in* said received digital data [stream] based on said decrypted encryption key.

8. A copy prevention method for a digital [video] *data* system as claimed in claim 7, wherein said key information is predetermined by said digital [video] *data* system.

9. A copy prevention method for a digital [video] *data* system as claimed in claim 7, wherein said decrypting step (d) [is operated in] *operates on* units of *a* predetermined block of said received digital data stream.

10. A copy prevention apparatus for a digital [video] *data* system comprising:

[receiving means for receiving a] *a receiver to receive* digital data [stream reproduced from a digital medium];

a key detector to detect an encryption key, which is a portion of said received digital data stream; *and* a decryption unit to decrypt said encryption key using key information and to decrypt *digital content included in* said received digital data [stream] based on said decrypted encryption key.

11. A copy prevention apparatus for a digital [video] *data* system as claimed in claim 10, wherein said key information is predetermined by said digital [video] *data* system.

12. A copy prevention apparatus for a digital [video] *data* system as claimed in claim 10, wherein said decryption unit [is operated in] *operates on* units of *a* predetermined block of said received digital data [stream].

13. A copy prevention method for a digital video system comprising the steps of:

(a) receiving [a] digital data [stream] reproduced from a digital medium;

(b) detecting an encryption key, which is a portion of said received digital data [stream];

(c) decrypting said encryption key using predetermined key information;

(d) decrypting *digital video content included in* said received digital data [stream] based on said decrypted encryption key.

14. A copy prevention method for a digital video system as claimed in claim 13, wherein said decrypting step (d) [is operated in] *operates on* units of *a* predetermined block of said received digital data [stream].

15. A copy prevention apparatus for a digital video system comprising:

*a* receiving [means for receiving a] *unit to receive* digital data [stream] reproduced from a digital medium;

a key detector to detect an encryption key, which is a portion of said received digital data [stream];

a decryption unit to decrypt said encryption key using predetermined key information and to decrypt *digital video content included in* said received digital data [stream] based on said decrypted encryption key.

16. A copy prevention apparatus for a digital video system as claimed in claim 15, wherein said decrypting unit [is operated in] *operates on* units of *a* predetermined block of said received digital data [stream].

17. A copy prevention method for a digital data system, comprising the steps of:

(a) receiving first key information;

(b) encrypting second key information using said first key information;

(c) encrypting digital data streams using said second key information; and (d) recording at least said encrypted second key information and said encrypted digital data streams on a digital medium.

18. The method of claim 17, wherein said *step* (b) randomly selects said second key information.

19. The method of claim 17, wherein said step (c) encrypts said digital data streams in blocks.

20. A copy prevention apparatus for a digital data system[,] comprising [the steps of]:

an encryption unit receiving first key information, encrypting second key information using said first key information, and encrypting digital data streams using said second key information; and a controller controlling recording of at least said encrypted second key information and said encrypted digital data streams on a digital medium.

21. The apparatus of claim 20, wherein said encryption unit randomly selects said second key information.

22. The apparatus of claim 20, wherein said encryption unit encrypts said digital data streams in blocks.

23. A recording medium having a data structure for controlling operation of *a* copy prevention function in a digital data processing device, comprising:

a digital data area *for* storing digital data encrypted using first key information; and a key information area *for* storing said first key information encrypted using second key information, said first key information operatively controlling the decryption of said encrypted digital data in a digital data process device.

24. A copy prevention method for a digital data system, comprising:

receiving first key information, said first key information for encrypting digital data;

encrypting said first key information using second information; and transferring said encrypted first key information.

25. The method of claim 24, wherein said encrypting step *involves a* public key [encrypts said second key information].

26. The method of claim 24, wherein said transferring step records said encrypted first key information on a digital medium.

27. The method of claim 24, wherein said transferring step transmits said encrypted first key information.

28. A copy prevention apparatus for a digital data system, comprising:

an encryption unit receiving first key information, said first key information for encrypting digital data, and encrypting said first key information using second key information; and a controller controlling a transfer of said encrypted first key information.

29. The apparatus of claim 28, wherein said encryption unit *uses a* public key [encrypts] *to encrypt* said first key information.

30. The apparatus of claim 28, wherein said controller controls recording said encrypted first key information on a digital medium.

31. The apparatus of claim 28, wherein said controller controls transmitting said encrypted first key information.

*32. The recording medium of claim 23, wherein the first key information is randomly selected.*

* * * * *